UNITED STATES PATENT OFFICE.

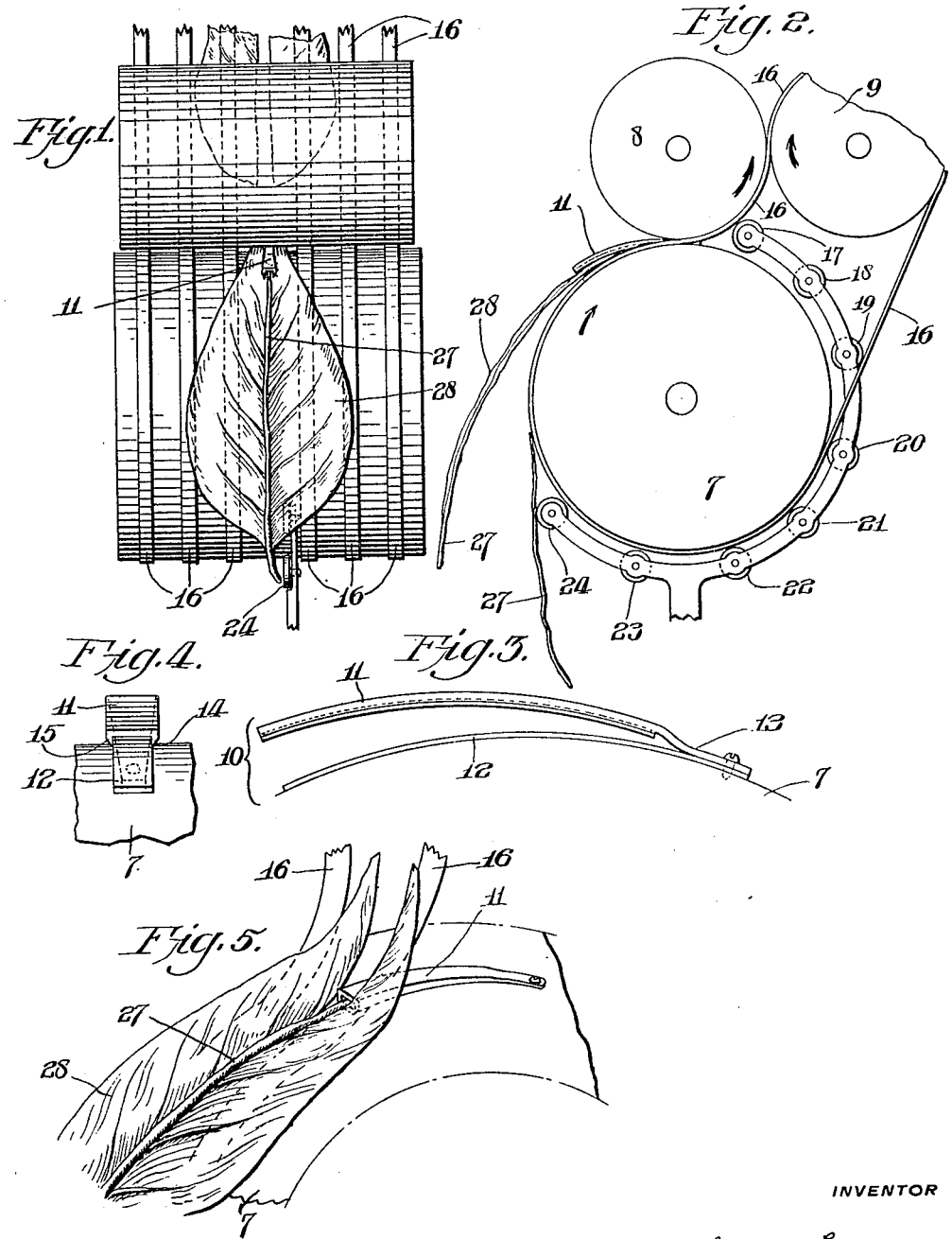

BERNARD LIBERMAN, OF PHILADELPHIA, PENNSYLVANIA.

MEANS FOR STEMMING TOBACCO.

1,206,868.   Specification of Letters Patent.   Patented Dec. 5, 1916.

Application filed August 2, 1913. Serial No. 782,587.

*To all whom it may concern:*

Be it known that I, BERNARD LIBERMAN, a citizen of the United States, residing at Philadelphia, in the county of Philadelphia, State of Pennsylvania, have invented a new and useful Means for Stemming Tobacco, of which the following is a specification.

My invention relates to improvements in method and means for stemming tobacco, or stripping from tobacco leaves the middle main stem thereof.

The object is to provide improved method and means, whereby the main stem or middle rib of the leaf may be stripped from the leaf, with a minimum of waste both of time and material.

Referring to the drawings which illustrate, merely by way of example, the method and means whereby my invention may be realized—Figure 1 is a front elevation of mechanism suitable for realizing my invention. Fig. 2 is a side elevation of same. Fig. 3 is a side elevation on an enlarged scale of the stem gripper. Fig. 4 is a front elevation of same. Fig. 5 is a view in perspective, showing the position of the leaf upon the drum with the underside or stem side up, after the cutting gripper has severed a portion of the stem from the small end of the leaf.

Similar numerals refer to similar parts throughout the several views.

Referring especially to Fig. 2, drums 7, 8 and 9 are suitably mounted, geared together and connected with a source of power, not shown, so as to have substantially the same peripheral speed of rotation.

Drum 7 has mounted on its periphery, at about the middle of its horizontal extension, the cutter and gripper member 10, comprising an upper member or jaw 11, and the lower member or jaw 12, which may be either integral or otherwise secured in operative relationship. I have shown the element mounted on the resilient extension 13 which tends normally to maintain the jaws in open position as shown in Fig. 3. One jaw is also provided with longitudinally extending knife edge flanges projecting, substantially at right angles to the surface of said jaw, toward the other jaw, and adapted to fit snugly over the other jaw, when said jaws are brought together, to form shears. In the example illustrated, I have shown these knife edge flanges 14 and 15 extending downwardly from jaw 11 and adapted to form shears with the lower jaw 12. A plurality of tapes 16 are carried about parts of the peripheries of drums 7, 8 and 9. A plurality of rollers 17 to 24 are suitably supported and positioned as and for the purpose hereinafter described.

In the operation employing the mechanism, herein illustrated and described merely by way of example, the leaf 28 is turned underside up, for the reason to be explained later on. In this position the leaf is laid upon the drum 7 and the small end or point inserted between the jaws 11 and 12 of the cutter and gripper, in approximately the position shown in Fig. 2. The point of the leaf is so inserted between said jaws that the stem will lie between the knife flanges 14 and 15, when the jaw 11 is depressed. The machine is then started, and as drums 7 and 8 rotate in the directions of the arrows shown in Fig. 2, the gripping elements are carried between said drums and caused to close one upon the other. This brings the knife-edge flanges 14 and 15 down over the leaf on each side of the middle stem lying upon element 12. This causes a severing of the leaf on each side of the stem from the point of the leaf for two or three inches, depending upon the distance of insertion of the leaf between the gripping elements. The portion of the stem which has been cut from the leaf has also been securely gripped between the gripping elements 11 and 12. Meanwhile the leaf portions flanking the portion of stem 27 which has been cut therefrom, are carried upwardly between tapes 16 and drum 8. A further movement of drums 7 and 8 serves to carry the stem around drum 7, and the leaf upwardly between tapes 16 and drum 8. It will be understood that tapes 16 are held tightly against drum 8, so that there is an efficient clamping of the leaf between the tapes and drum 8. The result of carrying the stem around drum 7 while the leaf travels in a different path between tapes 16 and drum 8, is that the stem 17 is drawn through the leaf, from what is normally the underside, through and away from what was the upper or smooth side of the leaf, while the adjacent leaf portions are firmly clamped between tapes 16 and drum 8.

By the underside of the leaf I mean the underside of the tobacco leaf as it grows.

The upperside is substantially smooth while from the surface of the underside projects the stem or rib. I have discovered that when it is attempted to strip this stem or rib from the leaf in the direction of its projection that the same has a tendency to split and will not ordinarily come away clean from the leaf in its entirety. When however the stem is drawn through the leaf in a direction opposite to that of its projection, as clearly shown in Fig. 5, while the adjacent edges of the leaf are held between the tapes 16 and drum 8, the separation of the stem from the leaf is clean and complete.

The rollers 17 to 24 are arranged around the periphery of drum 7 to engage the element 11 successively to prevent it from assuming the open position and thus releasing the stem until it has been drawn completely from the leaf. The last roller 24 is in such a position that, before the end of element 11 has passed the influence of same, the stem has been completely drawn from the leaf, so that when element 11 passes the influence of roller 24, the same assumes the open position, and the severed stem 27 is released to fall. This first open position of the gripper is shown in Fig. 2. This open position is maintained until the same reaches the influence of drum 8. The gripper is shown in Fig. 2, in the open position just before coming under the influence of drum 8. It is while in this position that the point of the leaf is inserted between the jaws as above described.

It is to be noted that the clamping and cutting elements are tapered in their longitudinal extension, as shown in Figs. 4 and 5 and the knife-edge flanges converge in their longitudinal extension so as to correspond as nearly as possible with the taper of the stem and so that the line of cut between the leaf and stem on both sides, will be as close as possible to the stem, so as to save waste of the leaf.

The severed leaf elements which are carried between tapes 16 and drum 8, may be delivered over drum 9, or by any other means to any desired point. But the method or mechanism for operating upon the leaf, beyond the severance of the stem therefrom, forms no part of the present invention, and is therefore not described in this disclosure.

By the use of the term "flanking" in the following claims I mean to indicate that the clamping means engages the leaf on each side of the stem only, and does not engage the stem as would be the case where the leaf is clamped or pressed between two parallel rollers extending transverse the path of travel of the leaf.

What I claim is:

1. In a device for stripping the main stem or rib from the tobacco leaf, the combination of flanking means for clamping the leaf on each side of the stem progressively at points of severance of the stem therefrom and means for then pulling the stem through the leaf and away therefrom.

2. In a device for stripping the main stem or rib from the tobacco leaf, the combination of flanking means for clamping the leaf on each side of the stem progressively at points of severance of the stem therefrom and means for then pulling the stem through the leaf from the small end toward the butt.

3. In a device for stripping the main stem or rib from the tobacco leaf, the combination of flanking means for clamping the leaf on each side of the stem progressively at points of severance of the stem therefrom and means for then pulling the stem through the leaf from the underside thereof.

4. In a device for stripping the main stem or rib from the tobacco leaf, the combination of flanking means for clamping the leaf on each side of the stem and means for then pulling the stem through the leaf and away therefrom while clamping the sides of the leaf adjacent said stem progressively at points of severance of the leaf from the stem.

5. In a device for stripping the main stem or rib from the tobacco leaf, the combination of flanking means for clamping the leaf on both sides of the stem, means for severing a portion of the stem from the leaf at the small end thereof, and means for gripping said stem portion and carrying the stem and leaf in different paths of travel so that the stem will be pulled through and clear of said leaf.

6. A cutting and clamping device comprising two coöperating elements having a resiliently actuated relationship, one element a channeled member provided with longitudinally extending knife-edge flanges adapted to form shears and the intermediate part a clamp with the other element.

7. A cutting and clamping device comprising two coöperating elements having a resiliently actuated relationship, one element a channeled member provided with longitudinally extending knife-edge flanges adapted to flank and to form shears with the other element, a moving support for said clamping and cutting device and a coöperating device for closing said clamping and cutting device against spring actuation.

8. A cutting and clamping device comprising two coöperating elements having a resiliently actuated relationship, one element a channeled member provided with longitudinally extending knife-edge flanges flanking the other element to form shears with the latter, a moving support for said clamping and cutting device and a coöperating device for closing and maintaining closed said clamping and cutting device against spring actuation during a certain part of the travel of said moving support.

9. Leaf stemming means comprising a plurality of rotating drums, clamping tapes carried thereby, a clamping and cutting device mounted on a drum comprising spring controlled coöperating elements, one element provided with knife-edge flanges adapted to form shears with the other element, said clamping device adapted to be closed by coming into contact with another of said drums, and means for maintaining the clamping device closed during a required portion of the drum rotation.

10. Leaf stemming means comprising a plurality of rotating drums, clamping tapes carried thereby, a clamping and cutting device mounted on a drum comprising spring controlled coöperating elements, one element provided with knife-edge flanges adapted to form shears with the other element, said clamping device adapted to be closed by coming into contact with another of said drums, and a plurality of rollers arranged about a portion of the drum periphery for engaging with the movable element of the clamping device.

11. Stem stripping means comprising a clamping and cutting device, one element of which is provided with knife-edge flanges adapted to form shears with the coöperating element, means for operating said clamping and cutting device to cut the leaf on each side of the stem near the small end thereof, and then to clamp the free part of said stem, means for clamping the balance of the leaf on each side of the stem and then for moving the parts relatively to strip the stem entirely from the leaf.

BERNARD LIBERMAN.

Witnesses:
MAE HOFMANN,
EUGENE ZIEGLER.

Copies of this patent may be obtained for five cents each, by addressing the "Commissioner of Patents, Washington, D. C."